(12) United States Patent
Tonozuka et al.

(10) Patent No.: US 9,112,227 B2
(45) Date of Patent: Aug. 18, 2015

(54) BATTERY PACK

(75) Inventors: Hiroshi Tonozuka, Saitama (JP); Noriyuki Okawa, Saitama (JP); Yoshikazu Takamatsu, Saitama (JP)

(73) Assignee: CALSONIC KANSEI CORPORATION, Saitama-shi (JP)

( * ) Notice: Subject to any disclaimer, the term of this patent is extended or adjusted under 35 U.S.C. 154(b) by 151 days.

(21) Appl. No.: 13/989,534

(22) PCT Filed: Oct. 6, 2011

(86) PCT No.: PCT/JP2011/073122
§ 371 (c)(1),
(2), (4) Date: May 24, 2013

(87) PCT Pub. No.: WO2012/073595
PCT Pub. Date: Jun. 7, 2012

(65) Prior Publication Data
US 2013/0244067 A1 Sep. 19, 2013

(30) Foreign Application Priority Data
Dec. 1, 2010 (JP) ................................. 2010-268158

(51) Int. Cl.
| | |
|---|---|
| *H01M 10/6553* | (2014.01) |
| *H01M 2/10* | (2006.01) |
| *H01M 10/60* | (2014.01) |
| *H01M 10/613* | (2014.01) |
| *H01M 10/647* | (2014.01) |
| *H01M 10/6556* | (2014.01) |
| *H01M 10/6561* | (2014.01) |
| *H01M 6/50* | (2006.01) |

(52) U.S. Cl.
CPC .......... *H01M 6/5038* (2013.01); *H01M 2/1061* (2013.01); *H01M 2/1077* (2013.01); *H01M 10/5004* (2013.01); *H01M 10/613* (2015.04); *H01M 10/647* (2015.04); *H01M 10/6553* (2015.04); *H01M 10/6556* (2015.04); *H01M 10/6561* (2015.04)

(58) Field of Classification Search
USPC ......................................................... 429/120
See application file for complete search history.

(56) References Cited

U.S. PATENT DOCUMENTS

| | | | | |
|---|---|---|---|---|
| 4,292,381 | A | * | 9/1981 | Klein ............................ 429/120 |
| 5,871,861 | A | * | 2/1999 | Hirokou et al. ............... 429/149 |
| 7,074,517 | B2 | * | 7/2006 | Higashino ....................... 429/66 |

(Continued)

FOREIGN PATENT DOCUMENTS

| | | |
|---|---|---|
| CN | 1666359 A | 9/2005 |
| CN | 101378110 A | 3/2009 |

(Continued)

*Primary Examiner* — Gregg Cantelmo
(74) *Attorney, Agent, or Firm* — Foley & Lardner LLP

(57) ABSTRACT

A battery pack includes unit cells and holders for sandwiching the unit cells. The holder includes a holding portion which holds the unit cell such that an electrode of the unit cell projects from between the holder and another holder sandwiching the unit cell, and a plurality of projecting portions which project in a direction in which the electrode projects from the holding portion and face each other across the electrode projecting from the holding portion. The projecting portion includes a passage which is formed along a direction, in which the unit cell is sandwiched, and is configured to flow fluid, and an opening which communicates with the passage and is open toward the electrode projecting from the holding portion.

3 Claims, 2 Drawing Sheets

(56) References Cited

U.S. PATENT DOCUMENTS

| | | |
|---|---|---|
| 2004/0021442 A1* | 2/2004 | Higashino .................. 320/112 |
| 2005/0130033 A1 | 6/2005 | Iwamura et al. |
| 2007/0141457 A1* | 6/2007 | Amagai ...................... 429/152 |
| 2009/0061305 A1 | 3/2009 | Nishida et al. |
| 2009/0104512 A1* | 4/2009 | Fassnacht et al. ............ 429/120 |
| 2009/0258288 A1* | 10/2009 | Weber et al. ................. 429/120 |
| 2009/0286141 A1* | 11/2009 | Nakamura .................... 429/82 |
| 2010/0310909 A1* | 12/2010 | Yun et al. ..................... 429/90 |
| 2011/0293982 A1* | 12/2011 | Martz et al. .................. 429/120 |

FOREIGN PATENT DOCUMENTS

| | | | |
|---|---|---|---|
| DE | 102010050993 A1 | * | 5/2010 |
| EP | 1 577 966 A2 | | 9/2005 |
| EP | 1 798 787 A2 | | 6/2007 |
| JP | 2006172870 A | * | 6/2006 |
| JP | 2006294366 A | * | 10/2006 |
| JP | 2008-103248 A | | 5/2008 |
| JP | 2008-234936 A | | 10/2008 |
| JP | 2009-059473 A | | 3/2009 |
| JP | 2009-146797 A | | 7/2009 |
| JP | 2009-187781 A | | 8/2009 |
| JP | 2010040420 A | * | 2/2010 |
| WO | WO 2009/080149 A1 | | 7/2009 |
| WO | WO 2009/128220 A1 | | 10/2009 |
| WO | WO 2010/067943 A1 | | 6/2010 |

* cited by examiner

BATTERY PACK

TECHNICAL FIELD

The present invention relates to a battery pack.

BACKGROUND ART

It is disclosed in JP2008-234936A to cause cooling air to flow along a terminal projecting surface from which electrode terminals project from a battery stack in order to cool a battery pack.

SUMMARY OF INVENTION

However, the above invention has a problem that a duct as a separate component has to be arranged to cause cooling air to flow to a region with high heat generation in a concentrated manner.

The present invention was developed to solve such a problem and aims to cause cooling air to flow to a region with high heat generation in a concentrated manner without using a duct as a separate component.

A battery pack according to one aspect of the present invention includes unit cells and holders for sandwiching the unit cells. The holder includes a holding portion which holds the unit cell such that an electrode of the unit cell projects from between the holder and another holder sandwiching the unit cell, and a plurality of projecting portion which project in a direction in which the electrode projects from the holding portion and face each other across the electrode projecting from the holding portion. The projecting portion includes a passage which is formed along a direction, in which the unit cell is sandwiched, and is configured to flow fluid, and an opening which communicates with the passage and is open toward the electrode projecting from the holding portion.

According to the aspect of the present invention, by providing the opening which communicates with the passage, in which the fluid flows, and is open toward the electrode projecting from the holding portion, the fluid can be caused to flow toward the electrode in a concentrated manner. Without using a duct or the like as another component, the fluid can be caused to flow toward the electrode in a concentrated manner.

An embodiment and advantages of the present invention are described in detail below with reference to the accompanying drawings.

EMBODIMENT OF INVENTION

Figure 1:
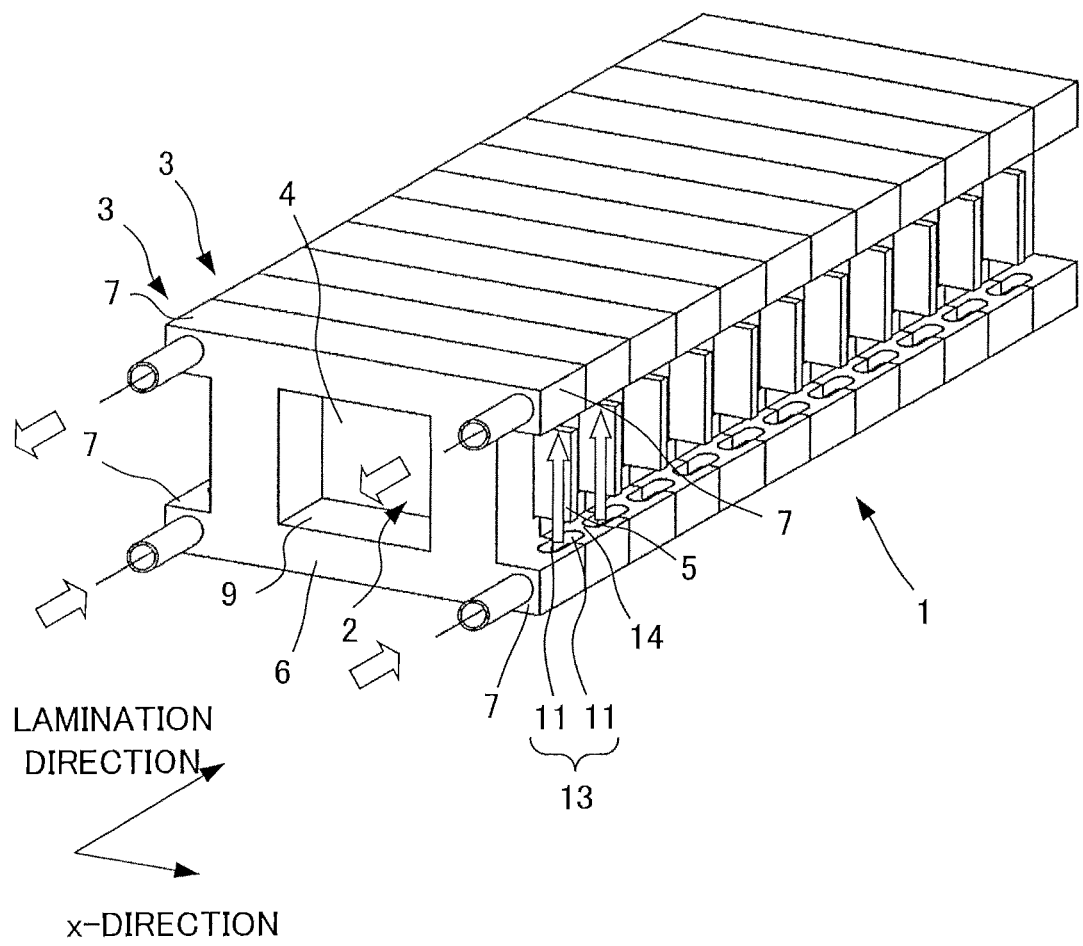
FIG. 1 is a perspective view of a battery pack of an embodiment.
Figure 2:
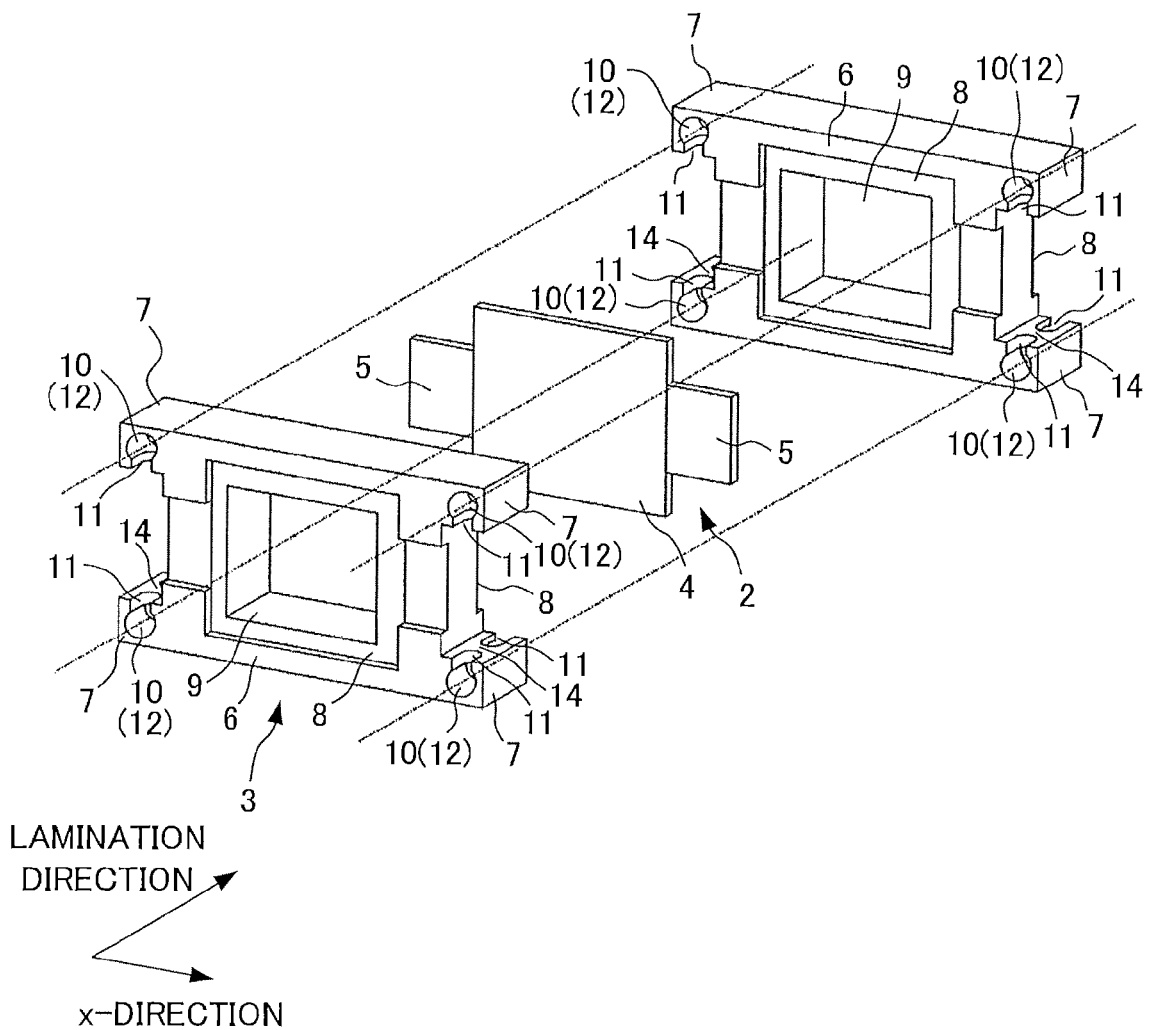
FIG. 2 is an exploded perspective view showing a portion of the battery pack of the embodiment.

A battery pack of an embodiment of the present invention is described using FIGS. 1 and 2. FIG. 1 is a perspective view of the battery pack of the embodiment. FIG. 2 is an exploded perspective view showing a portion of the battery pack of this embodiment.

The battery pack 1 is formed by laminating a plurality of unit cells 2 and a plurality of holders 3. It should be noted that a direction perpendicular to a lamination direction in FIG. 1 is described to be an x-direction here.

The unit cell 2 includes a main body portion 4 for performing charging and discharging and two electrodes 5, i.e., two terminals, connected to a positive electrode side or a negative electrode side of the main body portion 4. The main body portion 4 performs charging and discharging by connecting the two electrodes 5 to an external load and an external power supply.

Although the two electrodes 5 project in the x-direction from the main body portion 4, they project in opposite directions from the main body portion 4.

It should be noted that the electrodes 5 of the unit cell 2 are connected to the electrodes 5 and the like of the adjacent unit cells 2 by an unillustrated busbar.

One unit cell 2 is sandwiched in the lamination direction by two holders 3. That is, the lamination direction and a direction in which one unit cell 2 is sandwiched by two holders 3 coincide.

The holder 3 includes a holding portion 6 for holding the unit cell 2 and four flow portions 7 in which fluid flows.

The holding portion 6 has a rectangular shape when viewed in the lamination direction. In holding portion 6, a recess 8 is formed toward the lamination direction from a contact surface to be held in contact with the adjacent holder 3 when the holders 3 are laminated into the battery pack 1. A hole 9 penetrating in the lamination direction is formed in the recess 8. The recess 8 is formed on the surface where the unit cell 2 is held. That is, the holder 3 includes the holding portions 6 (recesses 8) on both surfaces except the holders 3 located at opposite ends in the lamination direction of the battery pack 1.

The recess 8 is formed in conformity with the shape of the unit cell 2. By arranging the unit cell 2 in the recess 8, the holding portion 6 holds the unit cell 2. The recess 8 is so formed that leading end sides of the electrodes 5 of the unit cell 2 project in the x-direction from the holding portion 6 when the unit cell 2 is arranged in the recess 8. That is, the leading end sides of the electrodes 5 of the unit cell 2 project in the x-direction between the holding portions 6 of two holders 3 sandwiching the unit cell 2 when the unit cell 2 is sandwiched by the two holders 3.

The flow portions 7 project in the x-direction, which is the same direction as the projecting direction of the leading end sides of the electrodes 5 of the unit cell 2 from the holding portion 6, from four corners of the holding portion 6. Two flow portions 7 project in the same direction as the x-direction, in which the electrodes 5 project, for one electrode 5, the leading end side of which projects from the holding portion 6. The two flow portions 7 projecting in the same x-direction are formed to face each other across the electrode 5 projecting from the holding portion 6.

The flow portion 7 is formed with a through hole 10 penetrating in the lamination direction and openings 11 communicating with the through hole 10.

The flow portions 7 are held in contact with the flow portions 7 of the adjacent holders 3 via the contact surfaces when the holders 3 are laminated into the battery pack 1. The through holes 10 communicate with the through holes 10 of the flow portions 7 of the adjacent holders 3 to form one fluid passage 12 as a whole when the holders 3 are laminated into the battery pack 1. It should be noted that an end portion of the fluid passage 12 is closed in the flow portion 7 located on one end portion in the lamination direction.

The opening 11 is open toward the contact surface to be held in contact with the flow portion 7 of the adjacent holder 3 and toward the electrode 5 projecting from the holding portion 6, and united with the opening 11 of the flow portion 7 of the adjacent holder 3 in the lamination direction to form one communication hole 13 when the holders 3 are laminated into the battery pack 1. The openings 11 are formed on the both surfaces except the holders 3 located at the opposite ends of the battery pack 1 in the lamination direction. A separation wall 14 separating the openings 11 is formed between the adjacent openings 11 in one flow portion 7. The flow of the fluid toward between the adjacent electrodes 5 from the communication hole 13 can be suppressed by the separation wall 14.

Next, functions of this embodiment are described.

When the battery pack 1 is charged or discharged, the temperature of the electrodes 5 increases. Accordingly, in this embodiment, the battery pack 1 is cooled by causing fluid, for example, air for cooling the battery pack 1, particularly the electrodes 5 to flow in two fluid passages 12 of the flow portions 7 using a pump. Some of flows of the fluid are shown by arrows in FIG. 1.

In this embodiment, the fluid is caused to flow into one of the fluid passages 12 facing each other across the electrodes 5. The fluid caused to flow into the fluid passage 12 flows toward the electrodes 5 from the communication holes 13 formed by the openings 11 of the flow portions 7 of the adjacent holders 3 in a concentrated manner and cools the electrodes 5.

In this embodiment, the unit cells 2 are held by the adjacent holders 3 (holding portions 6) and the communication holes 13 are formed by the adjacent holders 3 (flow portions 7). Thus, the electrodes 5 projecting from the holding portions 6 and the communication holes 13 overlap when viewed in the direction in which the openings 11 face each other across the electrodes 5 projecting from the holding portions 6, most of the fluid flowing from the communication holes 13 toward the electrodes 5 collides with the electrodes 5 and flows along the both surfaces of the electrodes 5 and cools the electrodes 5. Thus, cooling efficiency of the electrodes 5 is increased.

The fluid flowing from the communication holes 13 of one fluid passage 12 toward the electrodes 5 flows into the other fluid passage 12 facing the one fluid passage 12 across the electrodes 5 via the communication holes 13 communicating with the other fluid passage 12 and is discharged to the outside of the battery pack 1 via this fluid passage 12. It should be noted that the fluid in the other fluid passage 12 may be sucked, such as by a pump and the fluid flowing toward the electrodes 5 may flows into the other fluid passage 12.

Effects of the embodiment of the present embodiment are described.

Parts of the electrodes 5 are caused to project in the x-direction from the holding portions 6 sandwiching the unit cells 2, the flow portions 7 facing each other across the projecting electrodes 5 are provided, and the openings 11 communicating with the through holes 10 formed in the flow portions 7 are open toward the projecting electrodes 5. In this way, the fluid flowing in the through holes 10 (fluid passages 12) can be caused to flow from the openings 11 toward the electrodes 5 in a concentrated manner. Thus, the electrodes 5 can be efficiently cooled, for example, without using a duct or the like.

By forming the openings 11 and the recesses 8 of the holding portions 6 such that the openings 11 and the electrodes 5 overlap when the holders 3 are viewed in the facing direction of the openings 11, the fluid can be caused to flow from the openings 11 toward the electrodes 5 in a concentrated manner and the electrodes 5 can be efficiently cooled.

By forming one communication hole 13 by the openings 11 of the two holders 3 sandwiching the unit cell 2, the fluid can be caused to flow along the both surfaces of the electrode 5 and the electrode 5 can be efficiently cooled.

It should be noted that although the electrodes 5 of the unit cell 2 project in the opposite directions from the main body portion 4 in this embodiment, they may project in the same direction.

Further, the communication holes 13 (openings 11) of the fluid passage 12 to which the fluid is supplied may be formed to have a larger size toward a downstream side in the flowing direction of the fluid. This enables the laminated unit cells 2 to be evenly cooled.

The present invention is not limited to the above embodiment. It goes without saying that the present invention includes various changes and improvements which can be made within the scope of the technical idea of the present invention.

The present application claims a priority based on Japanese Patent Application No. 2010-268158 filed with the Japan Patent Office on Dec. 1, 2010, all the contents of which are hereby incorporated by reference.

The invention claimed is:

1. battery pack, comprising a unit cell and a holder for sandwiching the unit cell, wherein:
the holder includes:
a holding portion which holds the unit cell such that a terminal of the unit cell projects from between the holder and another holder sandwiching the unit cell, and
a plurality of projecting portions which project in a direction in which the terminal projects from the holding portion and face each other across the terminal projecting from the holding portion; and
each of the projecting portions includes:
a passage which is formed along a direction, in which the unit cell is sandwiched, and is configured to flow fluid, and
an opening which communicates with the passage and opens toward the terminal projecting from the holding portion.

2. The battery pack according to claim 1, wherein:
the opening forms one communication hole together with an opening of the another holder.

3. The battery pack according to claim 1, wherein:
each opening of two of the projecting portions, which project in a same direction, faces the terminal which projects from the holder and is located between the each opening of the two of the projecting portions.

* * * * *